United States Patent
Nishimura et al.

(10) Patent No.: US 12,259,279 B1
(45) Date of Patent: Mar. 25, 2025

(54) ELECTROMAGNETIC WAVE MEASURING APPARATUS AND ELECTROMAGNETIC WAVE MEASURING METHOD

(71) Applicant: Photonic Edge Inc., Gifu (JP)

(72) Inventors: Kota Nishimura, Gifu (JP); Takeshi Sugiyama, Gifu (JP); Shintaro Hisatake, Gifu (JP)

(73) Assignee: Photonic Edge Inc., Gifu (JP)

( * ) Notice: Subject to any disclaimer, the term of this patent is extended or adjusted under 35 U.S.C. 154(b) by 0 days.

(21) Appl. No.: 18/407,941

(22) Filed: Jan. 9, 2024

(30) Foreign Application Priority Data

Oct. 26, 2023 (JP) .................................. 2023-183951

(51) Int. Cl.
   *G01J 9/00* (2006.01)
(52) U.S. Cl.
   CPC ....................... *G01J 9/00* (2013.01)
(58) Field of Classification Search
   CPC ........................................................ G01J 9/00
   See application file for complete search history.

(56) References Cited

U.S. PATENT DOCUMENTS

| 10,451,663 B2 | 10/2019 | Hisatake et al. |
| 10,761,126 B2 | 9/2020 | Hisatake et al. |
| 2018/0188305 A1 | 7/2018 | Hisatake et al. |
| 2018/0238948 A1 | 8/2018 | Hisatake et al. |

FOREIGN PATENT DOCUMENTS

| JP | 2014-052272 A | | 3/2014 | |
| JP | 2017-015703 A | | 1/2017 | |
| WO | WO2017/002782 | * | 6/2016 | |
| WO | WO-2017002782 A1 | * | 1/2017 | ......... G01R 29/0814 |
| WO | 2017/026494 A1 | | 2/2017 | |

\* cited by examiner

*Primary Examiner* — Tony Ko
(74) *Attorney, Agent, or Firm* — Morgan, Lewis & Bockius LLP

(57) ABSTRACT

An electromagnetic wave measuring apparatus includes: a light source unit configured to output a first laser beam whose frequency is settable, and a second laser beam; an electro-optic probe configured to receive the first laser beam of a frequency that is set in the frequency range, the second laser beam, and a detection-target electromagnetic wave; an optical filter; and a light-receiving element configured to convert a light beam that has passed through the optical filter into an electrical signal. The electro-optic probe outputs the first laser beam, the second laser beam, a first sideband beam, and a second sideband beam. The optical filter attenuates at least one of a frequency component of the first laser beam and a frequency component of the second sideband beam, or at least one of a frequency component of the second laser beam and a frequency component of the first sideband beam.

9 Claims, 15 Drawing Sheets

ELECTROMAGNETIC WAVE MEASURING APPARATUS AND ELECTROMAGNETIC WAVE MEASURING METHOD

CROSS-REFERENCES TO RELATED APPLICATIONS

The present disclosure relates to an electromagnetic wave measuring apparatus and an electromagnetic wave measuring method.

This application is based upon and claims the benefit of priority from Japanese patent application No. 2023-183951 filed on Oct. 26, 2023 the disclosure of which is incorporated herein in their entirety by reference.

TECHNICAL FIELD

The present disclosure relates to an electromagnetic wave measuring apparatus and an electromagnetic wave measuring method.

BACKGROUND

Various devices for detecting an electromagnetic wave using an electro-optic crystal or the like have been developed. For example, JP 2017-015703A (Patent Document 1) discloses the following technology as an example of such a technology for detecting an electromagnetic wave. That is, an electromagnetic wave measuring apparatus includes a light source, an electro-optic probe for receiving light from the light source and an electromagnetic wave, an optical filter for receiving light output from the electro-optic probe, and a light-receiving element for converting light that has passed through the optical filter into an electrical signal. The electro-optic probe includes an electro-optic crystal and an optical fiber optically coupled to the electro-optic crystal. A direction of a unique axis of the electro-optic crystal and a polarization direction of light from the optical fiber that enters the electro-optic crystal are set so as to be parallel to each other.

Beyond the technology described in Patent Document 1, a technology is desired that enables measurement of an electromagnetic wave while flexibly dealing with changes in the frequency of light beams from the light source.

The present disclosure has been made to solve the foregoing problem, and an object thereof is to provide an electromagnetic wave measuring apparatus and an electromagnetic wave measuring method that enable measurement of an electromagnetic wave while flexibly dealing with changes in the frequency of light beams from a light source.

SUMMARY

An electromagnetic wave measuring apparatus according to the present disclosure includes: a light source unit configured to output a first laser beam whose frequency is settable in a predetermined frequency range, and a second laser beam; an electro-optic probe configured to receive the first laser beam of a frequency that has been set in the frequency range, the second laser beam, and a detection-target electromagnetic wave; an optical filter configured to receive a light beam output from the electro-optic probe and attenuate a frequency component outside a predetermined passband; and a light-receiving element configured to convert a light beam that has passed through the optical filter into an electrical signal, wherein the electro-optic probe outputs, to the optical filter, the first laser beam, the second laser beam, a first sideband beam generated by modulating the first laser beam, and a second sideband beam generated by modulating the second laser beam, and the optical filter attenuates the frequency component outside the passband, which is at least one of a frequency component of the first laser beam and a frequency component of the second sideband beam, or at least one of a frequency component of the second laser beam and a frequency component of the first sideband beam.

With the above configuration in which the electro-optic probe is provided with the first laser beam whose frequency is settable within the predetermined frequency range, the second laser beam, and the detection-target electromagnetic wave, and filtering processing is performed to attenuate the frequency component of at least one of the first laser beam set within the frequency range and the second sideband beam, or the frequency component of at least one of the second laser beam and the first sideband beam, of the light beams output from the electro-optic probe, a beat signal containing information regarding an electric field or the like of the detection-target electromagnetic wave can be obtained by performing the filtering processing using the same optical filter even when the frequency of the first laser beam has been changed within this frequency range. Accordingly, an electromagnetic wave can be measured while flexibly dealing with changes in the frequency of light beams from the light source.

(2) In the above item (1), the optical filter may be a band pass filter, and the optical filter may attenuate the frequency component outside the passband, which is at least one of the frequency component of the first laser beam and the frequency component of the second sideband beam.

With this configuration, even when the frequency of the first laser beam has been changed, the second laser beam and the first sideband beam can be extracted using the same filter, without changing the optical filter. Also, the passband of the optical filter can be narrowed compared to a configuration in which a band elimination filter is used as an optical filter. Thus, it is possible to favorably measure an electromagnetic wave using the first laser beam having a preferably set frequency while suppressing a decrease in the SNR (Signal-to-Noise Ratio) of the beat signal resulting from an increase in the passband of the optical filter.

(3) In the above item (1), the optical filter may be a band elimination filter, and the optical filter may attenuate the frequency component outside the passband, which is at least one of the frequency component of the second laser beam and the frequency component of the first sideband beam.

With this configuration, even when the frequency of the first laser beam has been changed, the first laser beam and the second sideband beam can be extracted using the same filter, without changing the optical filter.

(4) In any one of the above items (1) to (3), the passband of the optical filter may be configured to not overlap the frequency range.

With this configuration, a desired frequency component can be extracted, using the optical filter, out of frequency components of light beams output from the electro-optic probe while appropriately selecting the frequency of the first laser beam within the frequency range.

(5) In any one of the above items (1) to (4), the electromagnetic wave measuring apparatus may further include: a beam shifter configured to shift a frequency of the first laser beam; and a light/electromagnetic wave conversion unit configured to irradiate the electro-optic probe with an electromagnetic wave having a frequency equal to a difference between the frequency of the first laser beam whose frequency has been shifted by the beam shifter and a frequency of the second laser beam.

With this configuration, with an electromagnetic wave measuring apparatus of a self-heterodyne type, an electromagnetic wave can be measured while flexibly dealing with changes in the frequency of light beams from the light source. Further, compared to a configuration in which the frequency of the second laser beam is shifted instead of the frequency of the first laser beam, the SNR of the obtained beat signal can be improved, thereby enabling more accurate measurement of an electromagnetic wave in the terahertz region.

(6) In any one of the above items (1) to (4), the electromagnetic wave measuring apparatus may further include: a beam shifter configured to shift a frequency of the second laser beam; and a light/electromagnetic wave conversion unit configured to irradiate the electro-optic probe with an electromagnetic wave having a frequency equal to a difference between a frequency of the first laser beam and the frequency of the second laser beam whose frequency has been shifted by the beam shifter.

With this configuration, with an electromagnetic wave measuring apparatus of a self-heterodyne type, an electromagnetic wave can be measured while flexibly dealing with changes in the frequency of light beams from the light source.

(7) In any one of the above items (1) to (6), the light source unit may output the second laser beam whose frequency is settable.

With this configuration, more diverse electromagnetic wave measurements can be performed using two types of laser beams whose frequency can be changed.

(8) An electromagnetic wave measuring method according to the present disclosure for use in an electromagnetic wave measuring apparatus includes: a step of setting a frequency in a predetermined frequency range; a step of generating a first laser beam of the frequency that has been set in the frequency range, and a second laser beam; a step of providing the generated first laser beam and second laser beam and a detection-target electromagnetic wave to an electro-optic probe; a step of attenuating, using an optical filter, a frequency component outside a predetermined passband, of a light beam output from the electro-optic probe; and a step of converting a light beam that has passed through the optical filter into an electrical signal, using a light-receiving element, wherein the electro-optic probe outputs, to the optical filter, the first laser beam, the second laser beam, a first sideband beam generated by modulating the first laser beam, and a second sideband beam generated by modulating the second laser beam, and in the step of attenuating the frequency component outside the passband, the frequency component outside the passband is attenuated, which is at least one of a frequency component of the first laser beam and a frequency component of the second sideband beam, or at least one of a frequency component of the second laser beam and a frequency component of the first sideband beam.

With the above method in which the electro-optic probe is provided with the first laser beam whose frequency is settable within the predetermined frequency range, the second laser beam, and the detection-target electromagnetic wave, and filtering processing is performed to attenuate the frequency component of at least one of the first laser beam set within the frequency range and the second sideband beam, or the frequency component of at least one of the second laser beam and the first sideband beam, of the light beams output from the electro-optic probe, a beat signal containing information regarding an electric field or the like of the detection-target electromagnetic wave can be obtained by performing the filtering processing using the same optical filter even when the frequency of the first laser beam has been changed within this frequency range. Accordingly, an electromagnetic wave can be measured while flexibly dealing with changes in the frequency of light beams from the light source.

Effects of the Present Disclosure

With the present disclosure, an electromagnetic wave can be measured while flexibly dealing with changes in the frequency of light beams from the light source.

DETAILED DESCRIPTION OF PREFERRED EMBODIMENTS

Figure 1:
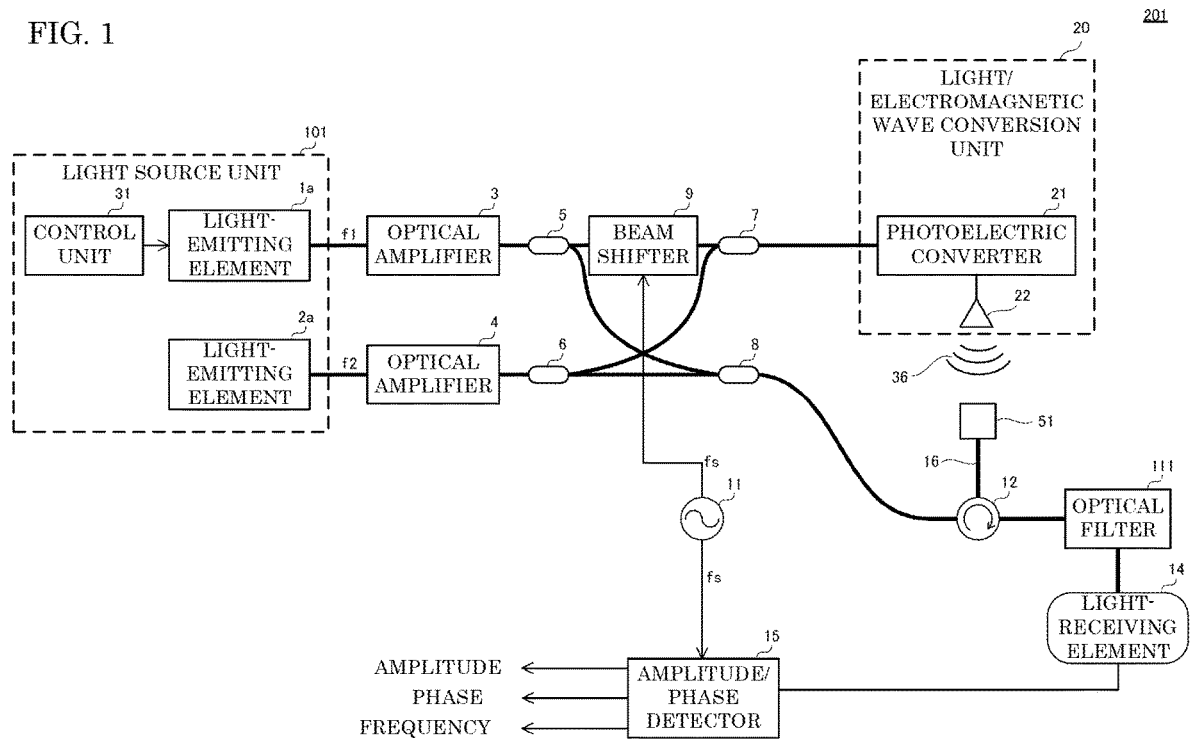
FIG. 1 is a diagram showing a configuration of an electromagnetic wave measuring apparatus according to the first embodiment of the present disclosure.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

First Embodiment

Configuration and Basic Operation

FIG. 1 is a diagram showing a configuration of an electromagnetic wave measuring apparatus according to the first embodiment of the present disclosure. Referring to FIG. 1, an electromagnetic wave measuring apparatus 201 includes: optical amplifiers 3 and 4; beam splitters 5 and 6; optical multiplexers 7 and 8; a beam shifter 9; an oscillator 11; a circulator 12; a light-receiving element 14; an amplitude/phase detector 15; a light/electromagnetic wave conversion unit 20; an electro-optic probe 51; a light source unit 101; and an optical filter 111. The light source unit 101 includes light-emitting elements 1a and 2a and a control unit 31. The light/electromagnetic wave conversion unit 20 includes a photoelectric converter 21 and an antenna 22. The antenna 22 is, for example, a horn antenna. The electromagnetic wave measuring apparatus 201 is an electromagnetic wave measuring apparatus of a self-heterodyne type. Thick lines in FIG. 1 indicate optical fibers 16. The same applies to the subsequent diagrams.

Optical transmission between the constituent elements of the electromagnetic wave measuring apparatus 201 may be performed through the optical fibers 16, or may be space transmission. An example of spatial transmission is a configuration in which an electro-optic crystal member is disposed on a semiconductor integrated circuit that outputs a detection-target electromagnetic wave 36, and the member is irradiated with a probe beam focused by an objective lens.

The light source unit 101 outputs a laser beam R1 whose frequency can be set, and a laser beam R2. The laser beam R1 output by the light source unit 101 is an example of a first laser beam. The laser beam R2 output by the light source unit 101 is an example of a second laser beam.

More specifically, the light-emitting element 1a outputs the laser beam R1 of a frequency f1. The light-emitting element 2a outputs the laser beam R2 of a frequency f2. The light-emitting element 1a is, for example, a variable-wavelength laser, with which the frequency f1 of the laser beam R1 can be set within a predetermined frequency range Rf1. More specifically, a user of the electromagnetic wave measuring apparatus 201 determines the frequency f1 of the laser beam R1 to be used, in accordance with a measurement target of the electromagnetic wave measuring apparatus 201, for example. The control unit 31 accepts content of a fixed setting of the frequency f1 from the user, and controls the frequency f1 of the laser beam R1 to be output by the light-emitting element 1a in accordance with the accepted setting content. The light-emitting element 2a is, for example, a fixed-wavelength laser, in which the frequency f2 of the laser beam R2 is set to a predetermined value.

For example, the frequency range Rf1 is determined by the specifications of the photoelectric converter 21. More specifically, a lower limit value of the frequency range Rf1 is (f2−PinMAX) Hz, and an upper limit value of the frequency range Rf1 is (f2−Pinmin) Hz. Here, Pinmin denotes a lower limit value of the frequency difference between the laser beams R1 and R2 that can be input to the photoelectric converter 21, and PinMAX denotes an upper limit value of the frequency difference between the laser beams R1 and R2 that can be input to the photoelectric converter 21.

The frequencies f1 and f2 are, for example, in the 1.5-μm band. The frequency equal to the difference between the frequencies f1 and f2 is, for example, in the terahertz band. Note that the frequency equal to the difference between the frequencies f1 and f2 may be in a band other than the terahertz band, and may be, for example, in the microwave band or the millimeter-wave band. In the following, an example where f2>f1 is described.

The optical amplifier 3 is, for example, an EDFA (Erbium Doped Fiber Amplifier), and is configured to amplify the laser beam R1 output by the light source unit 101 and output the resultant beam to the beam splitter 5.

The beam splitter 5 splits the laser beam R1 received from the optical amplifier 3 and outputs the resultant beams to the beam shifter 9 and the optical multiplexer 8.

The optical amplifier 4 is, for example, an EDFA, and is configured to amplify the laser beam R2 output by the light source unit 101 and output the resultant beam to the beam splitter 6.

The beam splitter 6 splits the laser beam R2 received from the optical amplifier 4 and outputs the resultant beams to the optical multiplexers 7 and 8.

The optical multiplexer 8 multiplexes the laser beam R1 received from the beam splitter 5 with the laser beam R2 received from the beam splitter 6, and outputs the resultant beams to the electro-optic probe 51 via the circulator 12.

The oscillator 11 generates an oscillation signal of a frequency fs, and outputs the generated oscillation signal to the beam shifter 9 and the amplitude/phase detector 15. The frequency fs is, for example, 500 KHz.

The beam shifter 9 shifts the frequency of the laser beam R1. More specifically, the beam shifter 9 is provided on an optical transmission path between the light-emitting element 1a and the light/electromagnetic wave conversion unit 20, and is configured to shift the frequency of the received laser beam R1 and output the resultant beam. More specifically, the beam shifter 9 shifts the laser beam R1 received from the beam splitter 5 by the frequency fs of the oscillation signal received from the oscillator 11, and outputs the shifted laser beam R1 to the optical multiplexer 7.

The optical multiplexer 7 multiplexes the laser beam R1 received from the beam shifter 9 with the laser beam R2 received from the beam splitter 6, and outputs the resultant beams to the light/electromagnetic wave conversion unit 20.

The light/electromagnetic wave conversion unit 20 irradiates the electro-optic probe 51 with a detection-target electromagnetic wave 36 having a frequency equal to the difference between the frequency of the laser beam R2 and the frequency of the laser beam R1 whose frequency has been shifted by the beam shifter 9. That is, the light/electromagnetic wave conversion unit 20 receives the laser beams R1 and R2 from the optical multiplexer 7, generates the detection-target electromagnetic wave 36 having a frequency equal to the difference between the frequencies of the received laser beams R1 and R2, and irradiates the electro-optic probe 51 with the generated detection-target electromagnetic wave 36.

More specifically, the photoelectric converter 21 includes, for example, a light-receiving element, and is configured to generate, using the laser beams R1 and R2 received from the optical multiplexer 7, the detection-target electromagnetic wave 36 having a frequency component equal to the difference between the frequencies of the laser beams R1 and R2 and radiate the generated detection-target electromagnetic wave 36 from the antenna 22 to a measurement target.

The electro-optic probe 51 receives the laser beams R1 and R2 output by the light source unit 101, and the detection-target electromagnetic wave 36. More specifically, the electro-optic probe 51 is disposed at a position where the electro-optic probe 51 can receive an electromagnetic wave radiated from the antenna 22, e.g. a position opposing the antenna 22. That is, the aforementioned measurement target may be disposed between the antenna 22 and the electro-optic probe 51, or may include the antenna 22, or may be the antenna 22 itself.

The electro-optic probe 51 detects the detection-target electromagnetic wave 36. More specifically, a light beam transmitted from the circulator 12 to the electro-optic probe 51 interacts, in the electro-optic probe 51, with the detection-target electromagnetic wave 36 from the antenna 22, is reflected and output to the circulator 12, and is output from the circulator 12 to the optical filter 111.

The optical filter 111 receives the light beams output from the electro-optic probe 51 and attenuates frequency components outside a predetermined passband F1. More specifically, the optical filter 111 attenuates components outside the passband F1, out of the frequency components of the light beams received from the circulator 12. For example, the optical filter 111 is a band pass filter.

The light-receiving element 14 converts a light beam that has passed through the optical filter 111 into a beat signal Bs, which is an electrical signal, and outputs the beat signal Bs to the amplitude/phase detector 15.

The amplitude/phase detector 15 detects the amplitude and phase of the beat signal Bs received from the light-receiving element 14, using the oscillation signal received from the oscillator 11, and outputs signals that respectively indicate the detected amplitude and phase. Further, for example, the amplitude/phase detector 15 can also detect the frequency of the beat signal Bs using the frequency of the probe beam, and output a signal indicating the detected frequency. Note that the amplitude/phase detector 15 may alternatively be configured to detect one or two of the amplitude, phase, and frequency of the beat signal Bs received from the light-receiving element 14.

Thus, with use of optical technologies, the electromagnetic wave measuring apparatus 201 can measure a spatial distribution of an electric field of an electromagnetic wave in a wide band ranging from a low frequency to a high frequency by, for example, measuring the electromagnetic wave while changing the position of the electro-optic probe 51. Furthermore, the electromagnetic wave measuring apparatus 201 can measure the amplitude and phase of an electric field in real time.

Note that the beam shifter 9 is not limited to being provided between the beam splitter 5 and the optical multiplexer 7, and may alternatively be provided between the beam splitter 6 and the optical multiplexer 8, between the beam splitter 5 and the optical multiplexer 8, or between the beam splitter 6 and the optical multiplexer 7.

That is, the beam shifter 9 is provided between the light-emitting element 1a or 2a and the light/electromagnetic wave conversion unit 20 or the electro-optic probe 51, and is configured to shift the frequency of a received light beam and output the resultant light beam. In other words, the beam shifter 9 shifts the frequency of a light beam from the light-emitting element 1a or 2a, and outputs the resultant light beam to the electro-optic probe 51 or the light/electromagnetic wave conversion unit 20.

The electromagnetic wave measuring apparatus 201 is not limited to including one beam shifter, and may alternatively include two beam shifters, for example. Specifically, in addition to the beam shifter 9, another beam shifter may be provided between the beam splitter 6 and the optical multiplexer 8, and these beam shifters may have opposite frequency shift directions, for example. In the case where the electromagnetic wave measuring apparatus 201 includes two or more beam shifters, the frequency of the oscillation signal given to the amplitude/phase detector 15 may be set as appropriate in accordance with the position, shift direction, or the like of each of the beam shifters.

Figure 2:
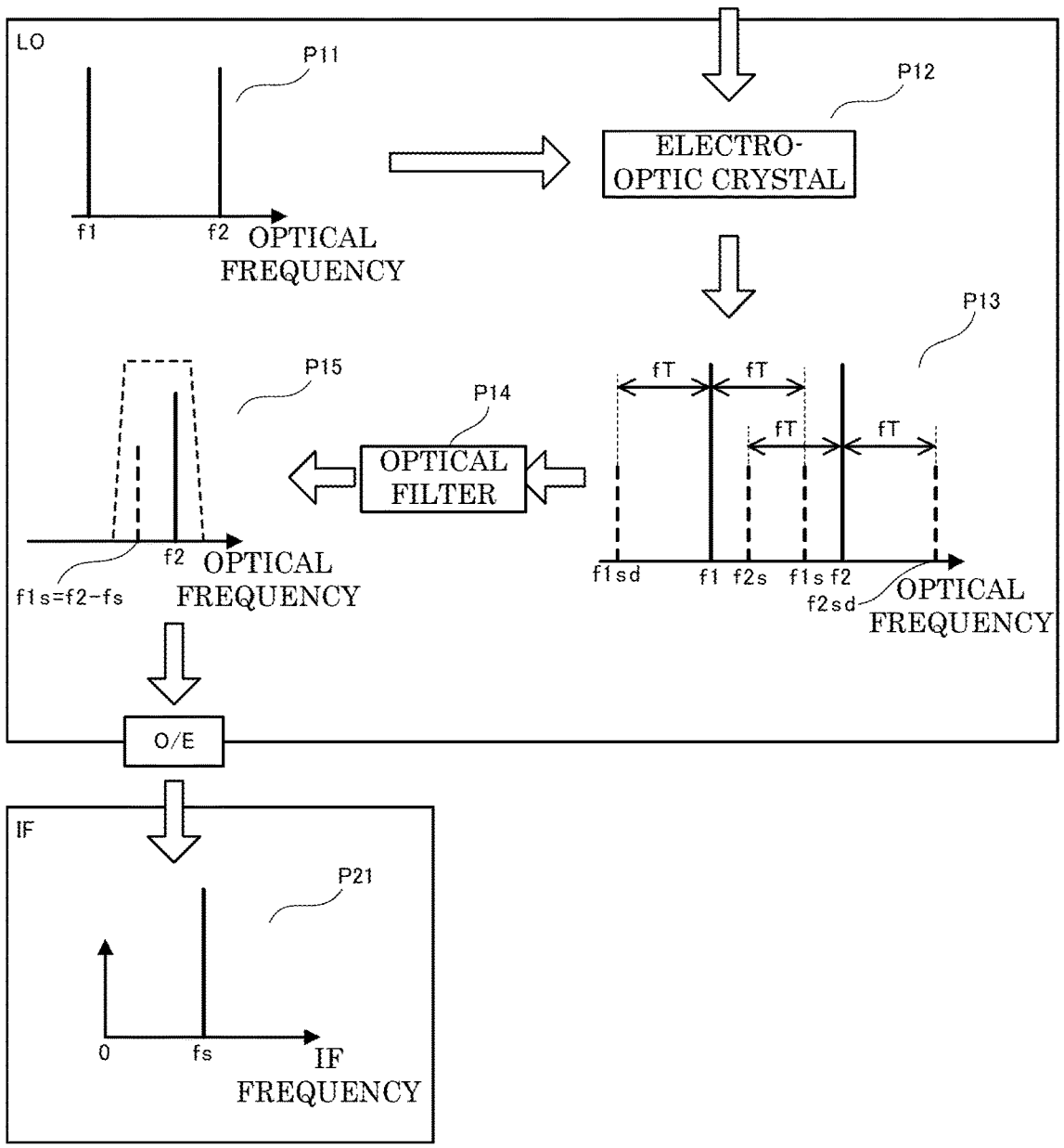
FIG. 2 is a diagram showing a measurement principle of the electromagnetic wave measuring apparatus according to the first embodiment of the present disclosure.

FIG. 2 is a diagram showing a measurement principle of the electromagnetic wave measuring apparatus according to the first embodiment of the present disclosure. Referring to FIGS. 1 and 2, the electromagnetic wave measuring apparatus 201 uses a CW (continuous wave), for example.

More specifically, on the RF (Radio Frequency) side, that is, in the system of the detection-target electromagnetic wave 36, the beam shifter 9 generates the laser beam R1 of a frequency (f1+fs), and the photoelectric converter 21 receives the laser beam R1 of the frequency (f1+fs) and the laser beam R2 of the frequency f2 that have been multiplexed by the optical multiplexer 7 (phase P1).

The photoelectric converter 21 performs photoelectric conversion (O/E); more specifically, the photoelectric converter 21 generates the detection-target electromagnetic wave 36 having a frequency component equal to the difference between the frequencies of the received two types of light beams, i.e. a frequency fT=f2−f1−fs (phase P2). The detection-target electromagnetic wave 36 is radiated in the direction of an electro-optic crystal of the electro-optic probe 51 (phase P12).

On the other hand, on the LO (Local) side, i.e. in the system of the probe beam, the laser beam R1 of the frequency f1 and the laser beam R2 of the frequency f2 that have been multiplexed by the optical multiplexer 8 serve as probe beams and are transmitted to the electro-optic crystal of the electro-optic probe 51 (phases P11 and P12).

The electro-optic probe 51 outputs, to the optical filter 111, the laser beams R1 and R2, sideband beams R1s and R1sd, which are generated by modulating the laser beam R1, and sideband beams R2s and R2sd, which are generated by modulating the laser beam R2. The frequency of the sideband beam R1s is higher than the frequency of the sideband beam R1sd. The sideband beam R1s is a sideband beam having a frequency closest to the frequency f2 of the laser beam R2, of the sideband beams generated by modulating the laser beam R1. The frequency of the sideband beam R2s is lower than the frequency of the sideband beam R2sd. The sideband beam R2s is a sideband beam having a frequency closest to the frequency f1 of the laser beam R1, of the sideband beams generated by modulating the laser beam R2. The sideband beam R1s is an example of a first sideband beam, and the sideband beam R2s is an example of a second sideband beam.

More specifically, a component of the frequency f1 of the probe beam is modulated within the electro-optic crystal that has been irradiated with the detection-target electromagnetic wave 36, and the sideband beam R1s that is a component of a frequency f1s(=f1+fT=f2−fs) and the sideband beam R1sd that is a component of a frequency f1sd (=f1−fT) are generated. Further, a component of the frequency f2 of the probe beam is modulated within the electro-optic crystal that has been irradiated with the detection-target electromagnetic wave 36, and the sideband beam R2s that is a component of a frequency f2s (=f2−fT=f1+fs) and the sideband beam R2sd that is a component of a frequency f2sd (=f2+fT) are generated (phase P13). The generated light beams are transmitted to the optical filter 111 together with the light beam of the frequency f1 and the probe beam of the frequency f2 (phase P14).

The optical filter 111 attenuates frequency components outside the passband F1, namely the frequency component of the laser beam R1 and the frequency component of the sideband beam R2s. Specifically, the optical filter 111 attenuates frequency components outside the passband F1, namely frequency components excluding the frequency component of the laser beam R2 and the frequency component of the sideband beam R1s. That is, the laser beam R2 of the frequency f2 and the sideband beam R1s of the frequency f1s are extracted by the optical filter 111 (phase P15).

Figure 3:
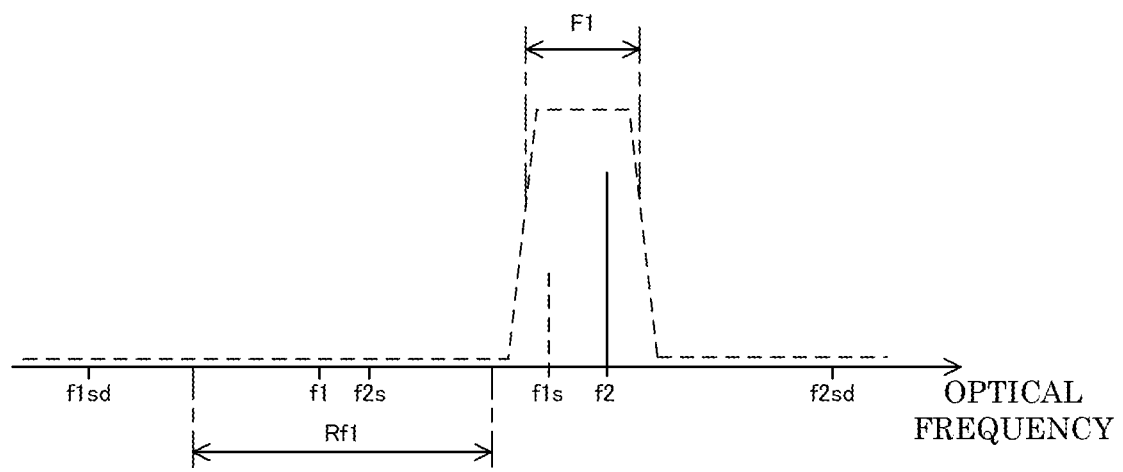
FIG. 3 is a diagram showing an example of the passband of the optical filter of the electromagnetic wave measuring apparatus according to the first embodiment of the present disclosure.

FIG. 3 is a diagram showing an example of the passband of the optical filter of the electromagnetic wave measuring apparatus according to the first embodiment of the present disclosure. In FIG. 3, the horizontal axis indicates the optical frequency [Hz]. Referring to FIG. 3, the optical filter 111 allows the laser beam R2 of the frequency f2 and the sideband beam R1s of the frequency f1s to pass therethrough without attenuation, while attenuating the laser beam R1 of the frequency f1, the sideband beam R2s of the frequency f2s, the sideband beam R1sd of the frequency f1sd, and the sideband beam R2sd of the frequency f2sd. As used herein, "without attenuation" means that attenuation for the purpose of filtering does not occur, and does not mean eliminating normal transmission losses. For example, the passband F1 of the optical filter 111 does not overlap the frequency range Rf1 in which the frequency f1 of the laser beam R1 can be set.

Referring again to FIGS. 1 and 2, the light beams extracted by the optical filter 111 are transmitted to the light-receiving element 14 and subjected to photoelectric conversion (O/E), and a beat signal Bs in the IF (Intermediate Frequency) band of f2−f1s=fs is obtained (phase P21).

Note that the optical filter 111 need only attenuate at least one of the laser beam R1 of the frequency f1 and the sideband beam R2s of the frequency f2s. In one example, the optical filter 111 may allow the sideband beam R2s of the frequency f2s to pass therethrough without attenuation, or may allow the sideband beam R2sd of the frequency f2sd to pass therethrough without attenuation. In this case as well, the beat signal Bs can be obtained at the light-receiving element 14.

Referring to FIG. 1, the amplitude/phase detector 15 is a lock-in amplifier having, for example, a mixer, a filter, a phase shifter, and the like, and is configured to generate an electrical signal in a baseband from the beat signal Bs in the IF band received from the light-receiving element 14, using the oscillation signal of the frequency fs received from the oscillator 11, and detect the amplitude and phase of the beat signal Bs in the IF band.

Thus, the electromagnetic wave measuring apparatus 201 enables measurement of the electric field of the detection-target electromagnetic wave 36, i.e. the amplitude and phase thereof.

The electromagnetic wave measuring apparatus 201 is configured to use the optical filter 111 to attenuate the laser beam R1 of the variable frequency f1 and extract the laser beam R2 of the fixed frequency f2 and the sideband beam R1s. Thus, even if the frequency f1 of the laser beam R1 to be output by the light-emitting element 1a is changed within the frequency range Rf1, the optical filter 111 need not be changed, and it is possible to extract the laser beam R2 of the frequency f2 and the sideband beam R1s of the frequency f1s using the same optical filter 111, and obtain the beat signal Bs of the frequency fs in the IF band using the light-receiving element 14. Accordingly, the electric field of the detection-target electromagnetic wave 36 can be easily measured while changing the settings of the frequency difference between the laser beams R1 and R2.

Furthermore, the electromagnetic wave measuring apparatus 201 is configured to extract the laser beam R2 of the fixed frequency f2 and the sideband beam R1s using the optical filter 111, and can therefore narrow the passband F1 of the optical filter 111 and set the frequency f1 of the laser beam R1 in a wider frequency range Rf1. Therefore, it is possible to favorably measure an electromagnetic wave using the laser beam R1 of a favorably set frequency f1 while suppressing a decrease in the SNR of the beat signal Bs resulting from an increase in the passband F1 of the optical filter 111.

Note that the light source unit 101 may alternatively be configured to output a laser beam R2 whose frequency can be set. That is, the light-emitting element 2a may be, for example, a variable-wavelength laser, and may be able to set the frequency f2 of the laser beam R2 within a predetermined frequency range Rf2s. In this case, the control unit 31 accepts a setting of the frequency f2 from the user of the electromagnetic wave measuring apparatus 201, and controls the frequency f2 of the laser beam R2 to be output by the light-emitting element 2a in accordance with the accepted setting content.

Referring again to FIG. 3, the frequency range Rf2s in which the frequency f2 of the laser beam R2 can be set is within the range of the passband F1 of the optical filter 111. For example, the frequency range Rf2s is a range with which the frequency f2 of the laser beam R2 and the frequency range f1s of the sideband beam R1s fall within the passband F1 of the optical filter 111.

Modification 1

Figure 4:
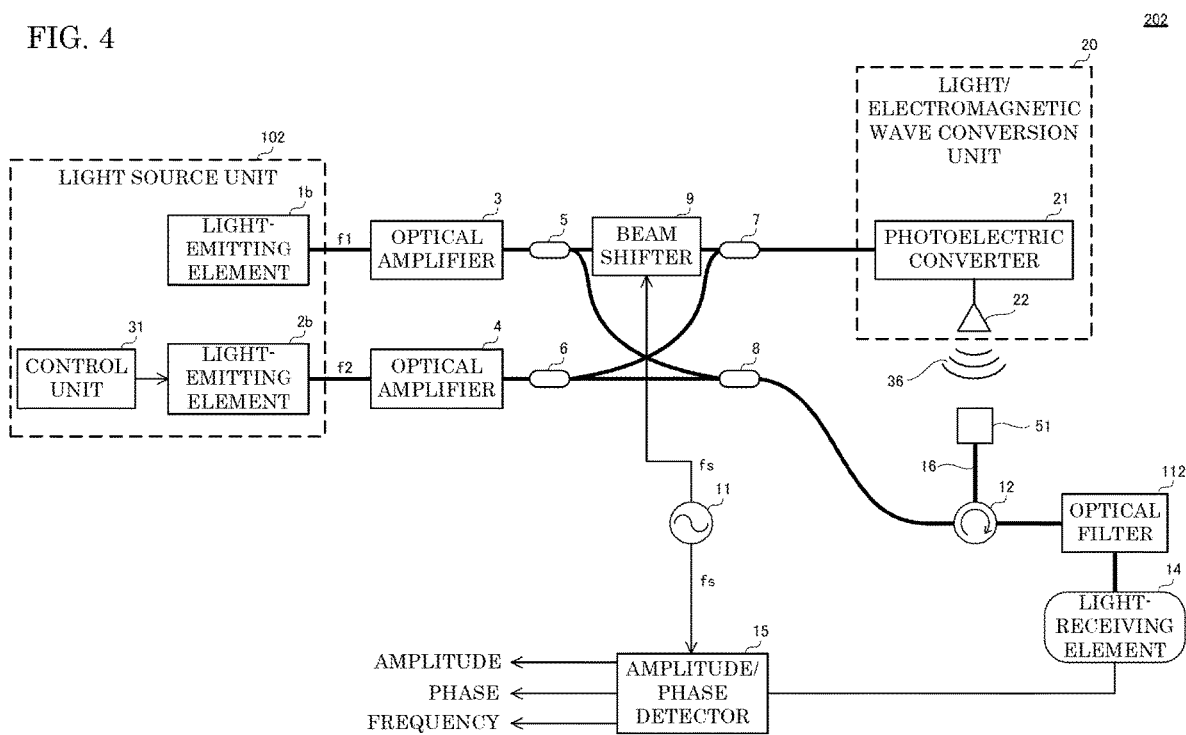
FIG. 4 is a diagram showing a configuration of an electromagnetic wave measuring apparatus according to a modification 1 of the first embodiment of the present disclosure.

FIG. 4 is a diagram showing a configuration of an electromagnetic wave measuring apparatus according to a modification 1 of the first embodiment of the present disclosure. Referring to FIG. 4, compared to the electromagnetic wave measuring apparatus 201, an electromagnetic wave measuring apparatus 202 includes a light source unit 102 instead of the light source unit 101, and an optical filter 112 instead of the optical filter 111. Compared to the light source unit 101, the light source unit 102 includes light-emitting elements 1b and 2b instead of the light-emitting elements 1a and 2a.

The light source unit 102 outputs a laser beam R1, and a laser beam R2 whose frequency can be set. The laser beam R1 output by the light source unit 102 is an example of a second laser beam. The laser beam R2 output by the light source unit 102 is an example of a first laser beam.

More specifically, the light-emitting element 1b outputs the laser beam R1 of a frequency f1. The light-emitting element 2b outputs the laser beam R2 of a frequency f2. The light-emitting element 1b is, for example, a fixed-wavelength laser, in which the frequency f1 of the laser beam R1 is set to a predetermined value. The light-emitting element 2b is, for example, a variable-wavelength laser, with which the frequency f2 of the laser beam R2 can be set within a predetermined frequency range Rf2. More specifically, the control unit 31 accepts a setting of the frequency f2 from the user of the electromagnetic wave measuring apparatus 202, and controls the frequency f2 of the laser beam R2 to be output by the light-emitting element 2b in accordance with the accepted setting content.

The beam shifter 9 shifts the frequency of the laser beam R1. More specifically, the beam shifter 9 is provided on an optical transmission path between the light-emitting element 1b and the light/electromagnetic wave conversion unit 20, and is configured to shift the frequency of the received laser beam R1 and output the resultant beam. More specifically, the beam shifter 9 shifts the laser beam R1 received from the beam splitter 5 by the frequency fs of the oscillation signal received from the oscillator 11, and outputs the shifted laser beam R1 to the optical multiplexer 7.

The light/electromagnetic wave conversion unit 20 irradiates the electro-optic probe 51 with an electromagnetic wave having a frequency equal to the difference between the frequency of the laser beam R2 and the frequency of the laser beam R1 whose frequency has been shifted by the beam shifter 9. That is, the light/electromagnetic wave conversion unit 20 receives the laser beams R1 and R2 from the optical multiplexer 7, generates the detection-target electromagnetic wave 36 having a frequency equal to the difference between the frequencies of the received laser beams R1 and R2, and irradiates the electro-optic probe 51 with the generated detection-target electromagnetic wave 36.

The optical filter 112 receives the light beams output from the electro-optic probe 51 and attenuates frequency components outside a predetermined passband F2. More specifically, the optical filter 112 attenuates components outside the passband F2, out of the frequency components of the light beams received from the circulator 12. For example, the optical filter 112 is a band pass filter.

Figure 5:
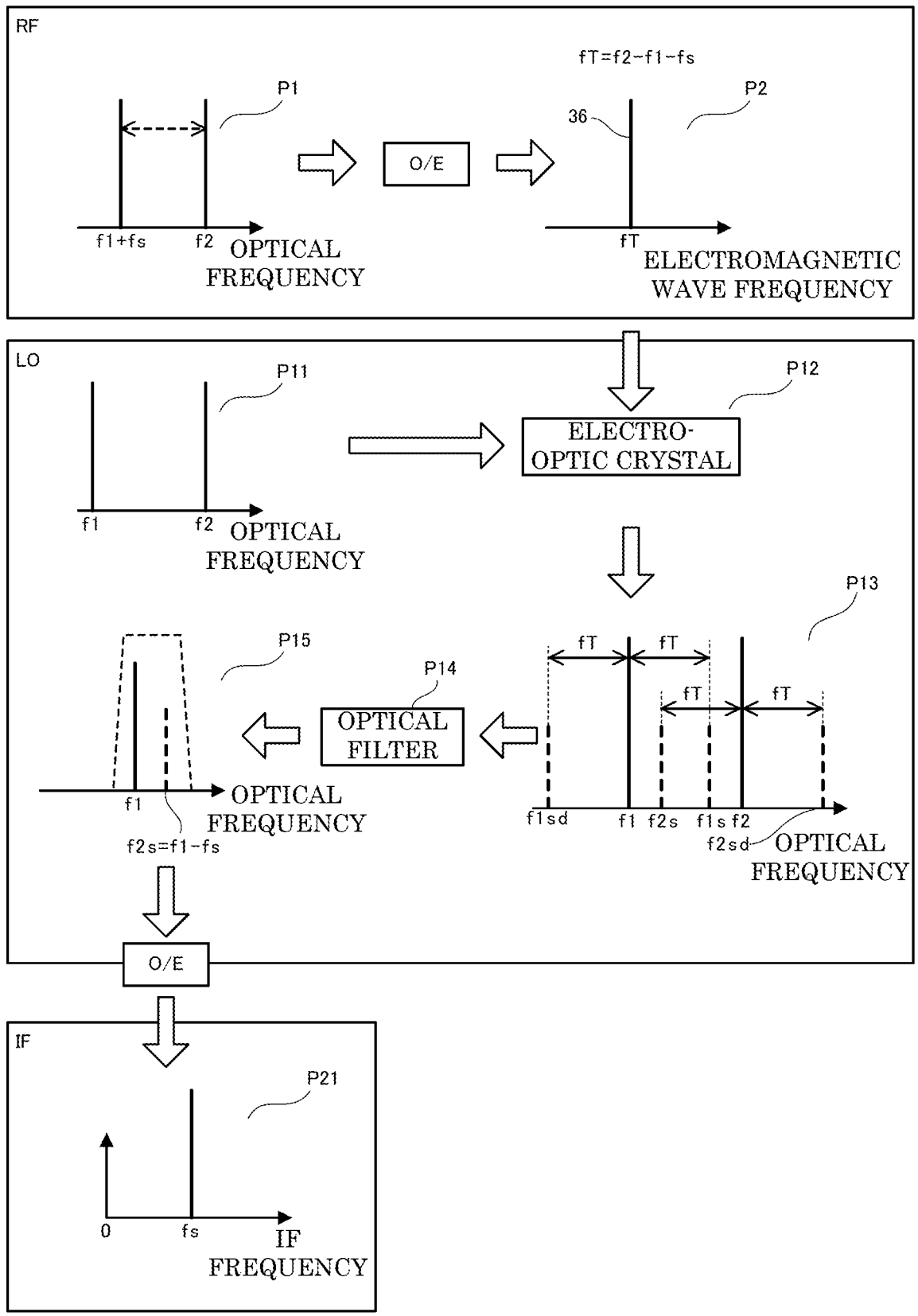
FIG. 5 is a diagram showing a measurement principle of the electromagnetic wave measuring apparatus according to the modification 1 of the first embodiment of the present disclosure.

FIG. 5 is a diagram showing a measurement principle of the electromagnetic wave measuring apparatus according to the modification 1 of the first embodiment of the present disclosure. Referring to FIGS. 4 and 5, compared to the electromagnetic wave measuring apparatus 201, the optical filter 112 of the electromagnetic wave measuring apparatus 202 attenuates frequency components outside the passband F2, namely the frequency component of the laser beam R2 and the frequency component of the sideband beam R1s. Specifically, the optical filter 112 attenuates frequency components outside the passband F2, namely frequency components excluding the frequency component of the laser beam R1 and the frequency component of the sideband beam R2s. That is, the laser beam R1 of the frequency f1 and the sideband beam R2s of the frequency f2s are extracted by the optical filter 112 (phase P15).

Figure 6:
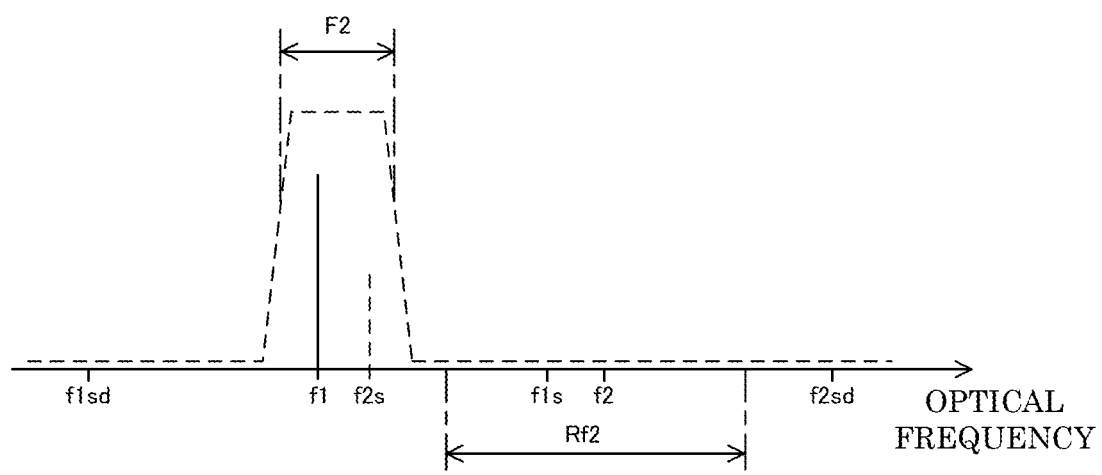
FIG. 6 is a diagram showing an example of the passband of the optical filter of the electromagnetic wave measuring apparatus according to the modification 1 of the first embodiment of the present disclosure.

FIG. 6 is a diagram showing an example of the passband of the optical filter of the electromagnetic wave measuring apparatus according to the modification 1 of the first embodiment of the present disclosure. In FIG. 6, the horizontal axis indicates the optical frequency [Hz]. Referring to FIG. 6, the optical filter 112 allows the laser beam R1 of the frequency f1 and the sideband beam R2s of the frequency f2s to pass therethrough without attenuation, while attenuating the laser beam R2 of the frequency f2, the sideband beam R1s of the frequency f1s, the sideband beam R1sd of the frequency f1sd, and the sideband beam R2sd of the frequency f2sd. For example, the passband F2 of the optical filter 112 does not overlap the frequency range Rf2 in which the frequency f2 of the laser beam R2 can be set.

Note that the optical filter 112 need only attenuate at least one of the laser beam R2 of the frequency f2 and the sideband beam R1s of the frequency f1s. In one example, the optical filter 112 may allow the sideband beam R1s of the frequency f1s to pass therethrough without attenuation, or may allow the sideband beam R1sd of the frequency f1sd to pass therethrough without attenuation. In this case as well, the beat signal Bs can be obtained at the light-receiving element 14.

The electromagnetic wave measuring apparatus 202 is configured to use the optical filter 112 to attenuate the laser beam R2 of the variable frequency f2 and extract the laser beam R1 of the fixed frequency f1 and the sideband beam R2s. Thus, even if the frequency f2 of the laser beam R2 to be output by the light-emitting element 2b is changed within the frequency range Rf2, the optical filter 112 need not be changed, and it is possible to extract the laser beam R1 of the frequency f1 and the sideband beam R2s of the frequency f2s using the same optical filter 112 and obtain the beat signal Bs of the frequency fs in the IF band using the light-receiving element 14. Accordingly, the electric field of the detection-target electromagnetic wave 36 can be easily measured while changing the settings of the frequency difference between the laser beams R1 and R2.

Furthermore, the electromagnetic wave measuring apparatus 202 is configured to extract the laser beam R1 of the fixed frequency f1 and the sideband beam R2s using the optical filter 112, and can therefore narrow the passband F2 of the optical filter 112 and set the frequency f2 of the laser beam R2 in a wider frequency range Rf2. Therefore, it is possible to favorably measure an electromagnetic wave using the laser beam R2 of a favorably set frequency f2 while suppressing a decrease in the SNR of the beat signal Bs resulting from an increase in the passband F2 of the optical filter 112.

Modification 2

Figure 7:
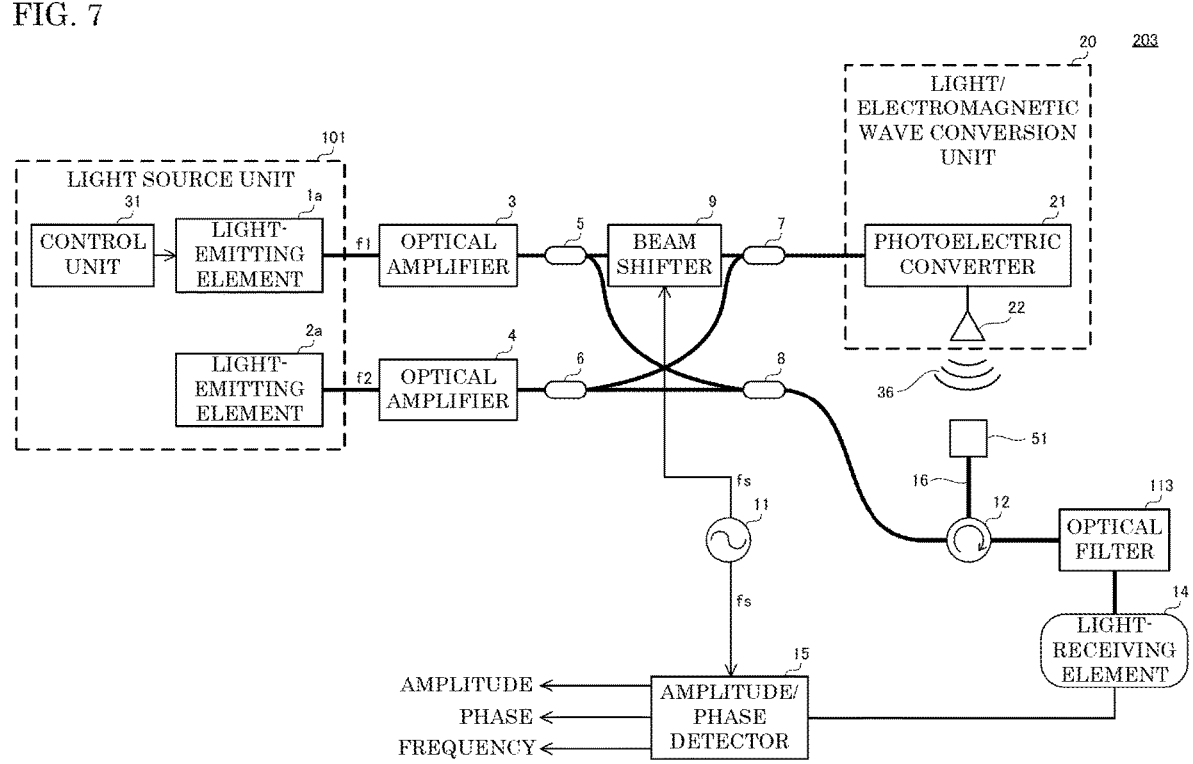
FIG. 7 is a diagram showing a configuration of an electromagnetic wave measuring apparatus according to a modification 2 of the first embodiment of the present disclosure.

FIG. 7 is a diagram showing a configuration of an electromagnetic wave measuring apparatus according to a modification 2 of the first embodiment of the present disclosure. Referring to FIG. 7, compared to the electromagnetic wave measuring apparatus 201, an electromagnetic wave measuring apparatus 203 includes an optical filter 113 instead of the optical filter 111.

The optical filter 113 receives the light beams output from the electro-optic probe 51 and attenuates frequency components outside a predetermined passband F3. More specifically, the optical filter 113 attenuates components outside the passband F3, out of the frequency components of the light beams received from the circulator 12. For example, the optical filter 113 is a band elimination filter.

Figure 8:
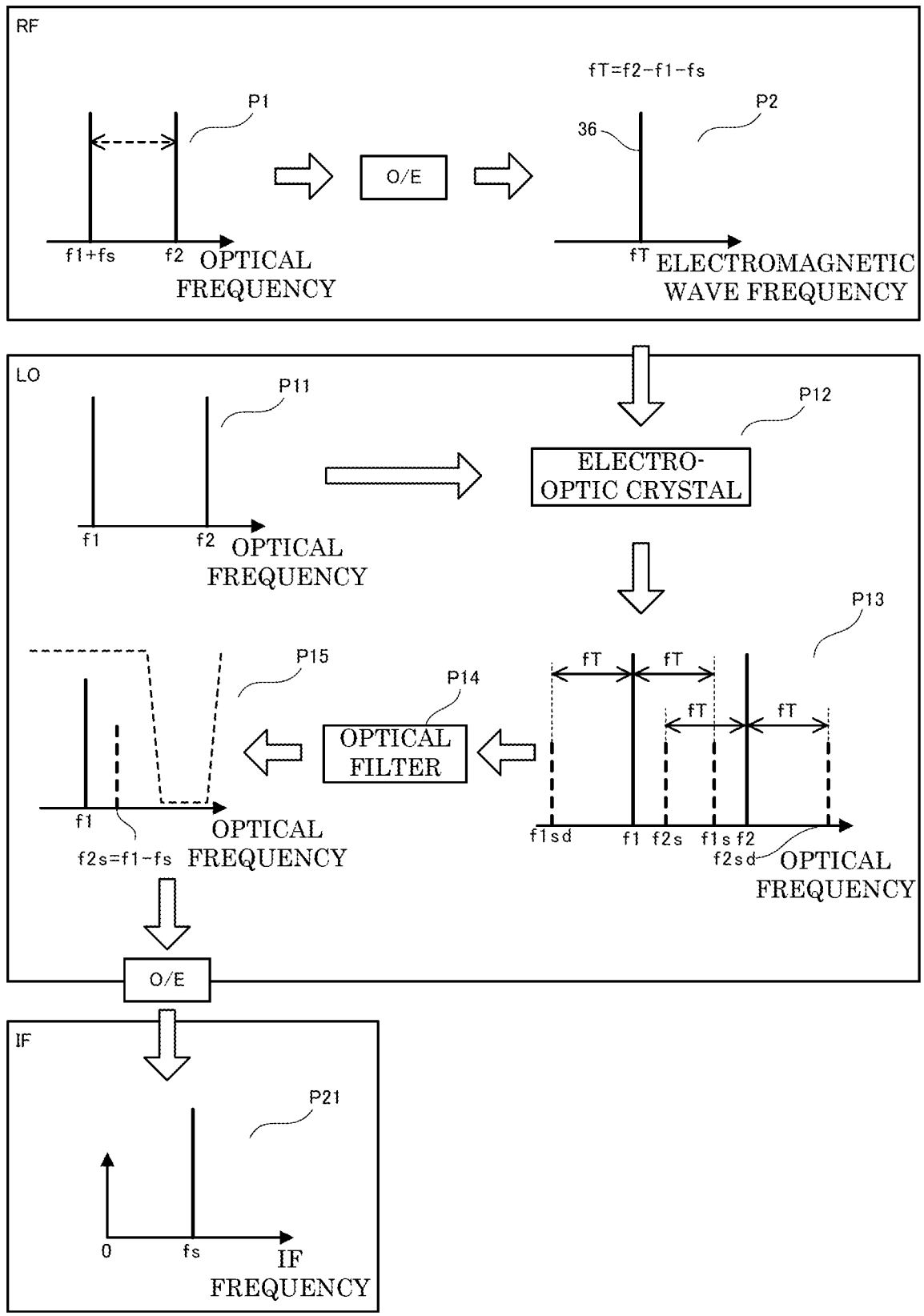
FIG. 8 is a diagram showing a measurement principle of the electromagnetic wave measuring apparatus according to the modification 2 of the first embodiment of the present disclosure.

FIG. 8 is a diagram showing a measurement principle of the electromagnetic wave measuring apparatus according to the modification 2 of the first embodiment of the present disclosure. Referring to FIGS. 7 and 8, compared to the electromagnetic wave measuring apparatus 201, the optical filter 113 of the electromagnetic wave measuring apparatus 203 attenuates frequency components outside the passband F3, namely the frequency component of the laser beam R2 and the frequency component of the sideband beam R1s. That is, the laser beam R1 of the frequency f1 and the sideband beam R2s of the frequency f2s are extracted by the optical filter 113 (phase P15).

Figure 9:
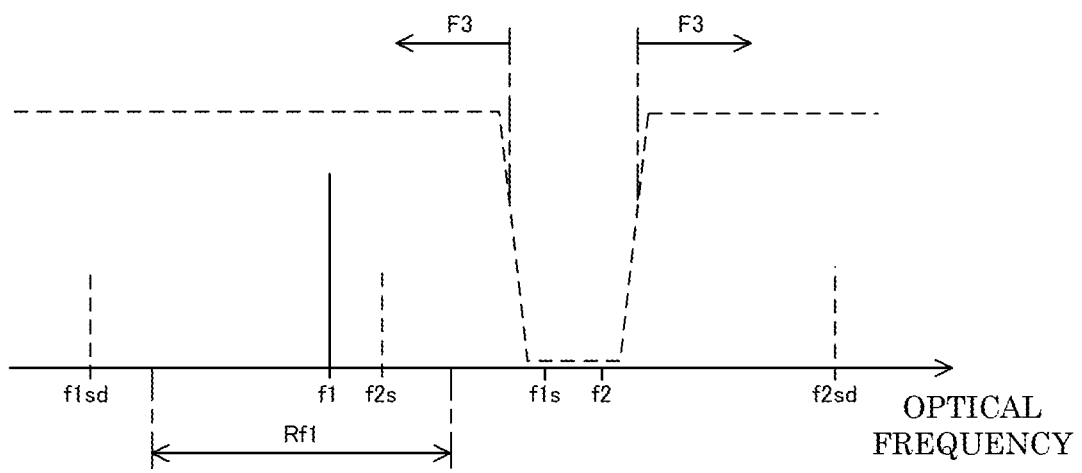
FIG. 9 is a diagram showing an example of the passband of the optical filter of the electromagnetic wave measuring apparatus according to the modification 2 of the first embodiment of the present disclosure.

FIG. 9 is a diagram showing an example of the passband of the optical filter of the electromagnetic wave measuring apparatus according to the modification 2 of the first embodiment of the present disclosure. In FIG. 9, the horizontal axis indicates the optical frequency [Hz]. Referring to FIG. 9, the optical filter 113 allows the laser beam R1 of the frequency f1, the sideband beam R2s of the frequency f2s, the sideband beam R1sd of the frequency f1sd, and the sideband beam R2sd of the frequency f2sd to pass therethrough without attenuation, while attenuating the laser beam R2 of the frequency f2 and the sideband beam R1s of the frequency f1s. For example, the passband F3 of the optical filter 113 does not overlap the frequency range Rf1 in which the frequency f1 of the laser beam R1 can be set.

Note that the optical filter 113 need only attenuate at least one of the laser beam R2 of the frequency f2 and the sideband beam R1s of the frequency f1s. That is, the optical filter 113 may allow at least one of the sideband beam R1s of the frequency f1s and the laser beam R2 of the frequency f2 to pass therethrough without attenuation. In this case as well, the beat signal Bs can be obtained at the light-receiving element 14.

The electromagnetic wave measuring apparatus 203 is configured to use the optical filter 113 to attenuate the laser beam R2 of the fixed frequency f2 and extract the laser beam R1 of the variable frequency f1 and the sideband beam R2s. Thus, even if the frequency f1 of the laser beam R1 to be output by the light-emitting element 1a is changed within the frequency range Rf1, the optical filter 113 need not be changed, and it is possible to extract the laser beam R1 of the frequency f1 and the sideband beam R2s of the frequency f2s using the same optical filter 113 and obtain the beat signal Bs of the frequency fs in the IF band using the light-receiving element 14. Accordingly, the electric field of the detection-target electromagnetic wave 36 can be easily measured while changing the settings of the frequency difference between the laser beams R1 and R2.

Modification 3

Figure 10:
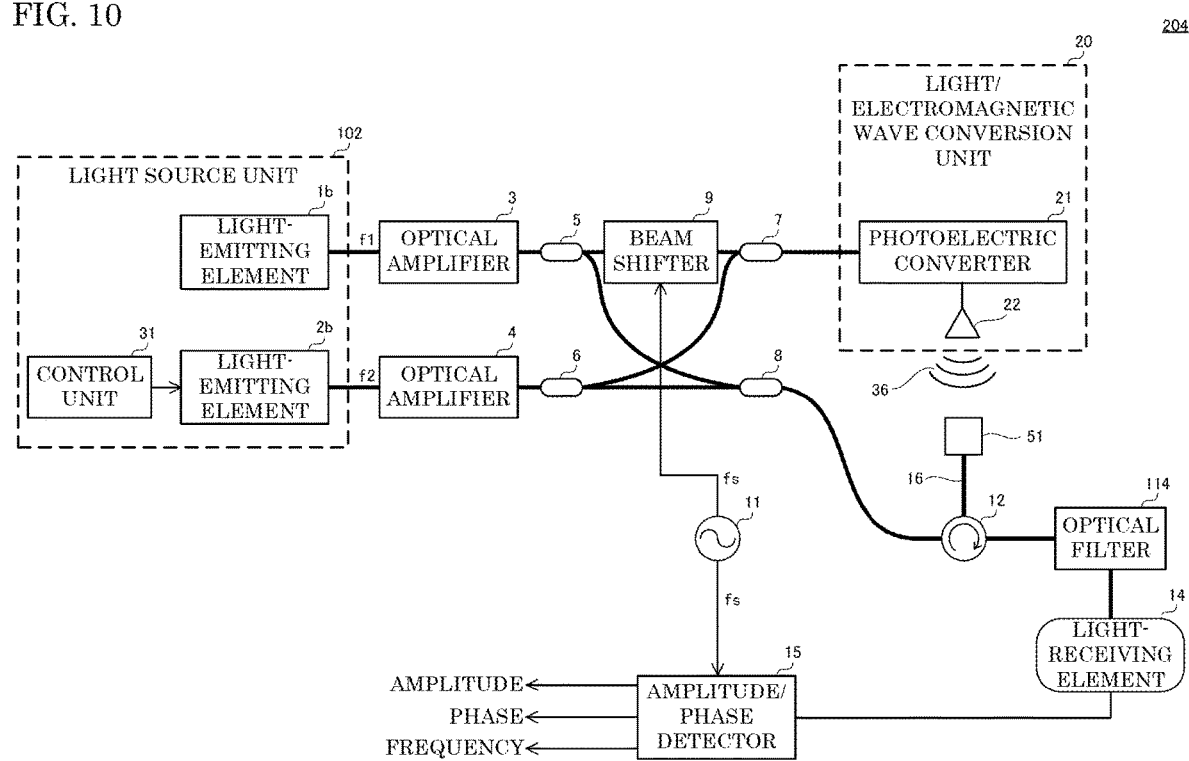
FIG. 10 is a diagram showing a configuration of an electromagnetic wave measuring apparatus according to a modification 3 of the first embodiment of the present disclosure.

FIG. 10 is a diagram showing a configuration of an electromagnetic wave measuring apparatus according to a modification 3 of the first embodiment of the present disclosure. Referring to FIG. 10, compared to the electromagnetic wave measuring apparatus 202, an electromagnetic wave measuring apparatus 204 includes an optical filter 114 instead of the optical filter 112.

The optical filter 114 receives the light beams output from the electro-optic probe 51 and attenuates frequency components outside a predetermined passband F4. More specifically, the optical filter 114 attenuates components outside the passband F4, out of the frequency components of the light beams received from the circulator 12. For example, the optical filter 114 is a band elimination filter.

Figure 11:
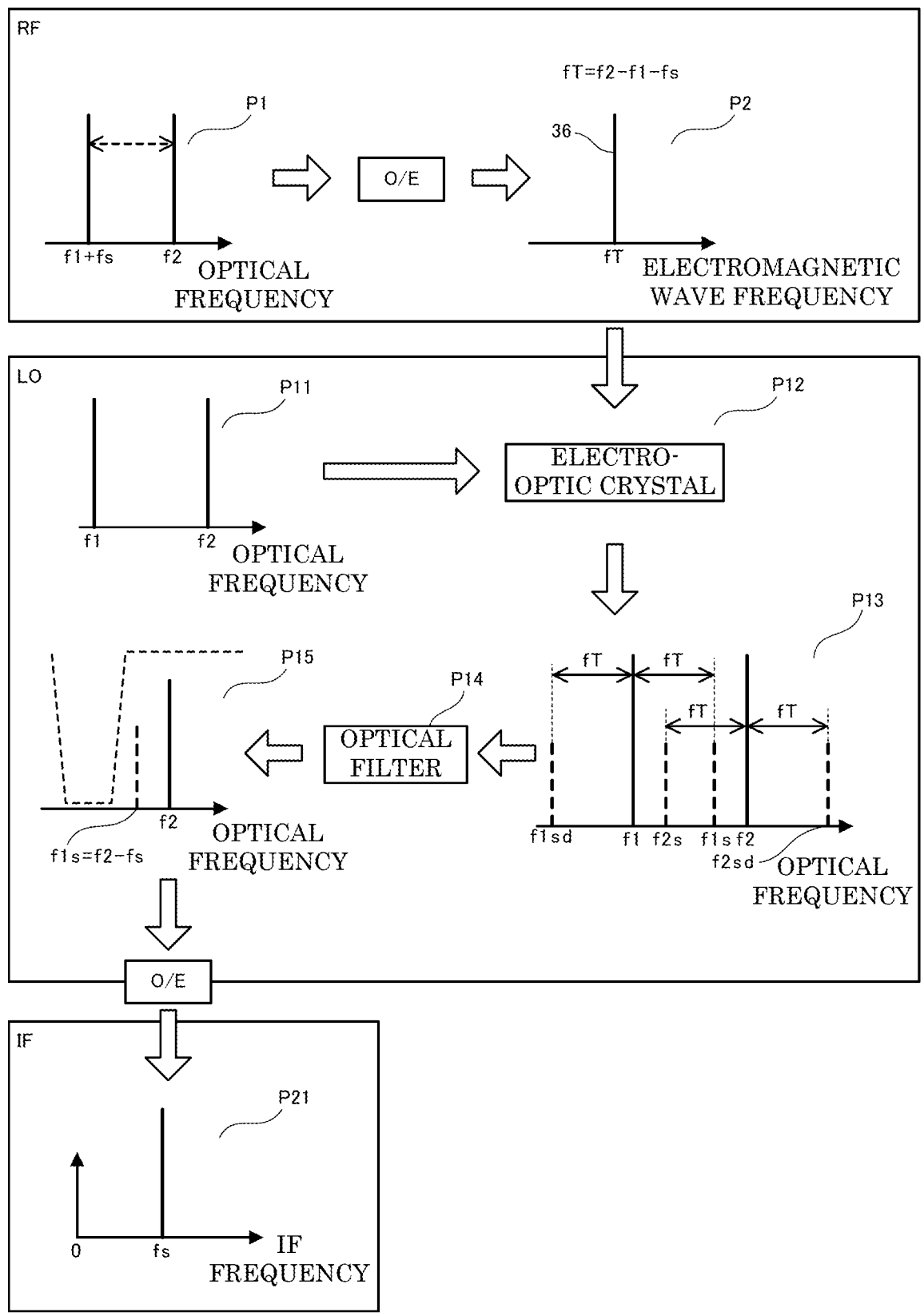
FIG. 11 is a diagram showing a measurement principle of the electromagnetic wave measuring apparatus according to the modification 3 of the first embodiment of the present disclosure.

FIG. 11 is a diagram showing a measurement principle of the electromagnetic wave measuring apparatus according to the modification 3 of the first embodiment of the present disclosure. Referring to FIGS. 10 and 11, compared to the electromagnetic wave measuring apparatus 202, the optical filter 114 of the electromagnetic wave measuring apparatus 204 attenuates frequency components outside the passband F4, namely the frequency component of the laser beam R1 and the frequency component of the sideband beam R2s. That is, the laser beam R2 of the frequency f2 and the sideband beam R2s of the frequency f1s are extracted by the optical filter 114 (phase P15).

Figure 12:
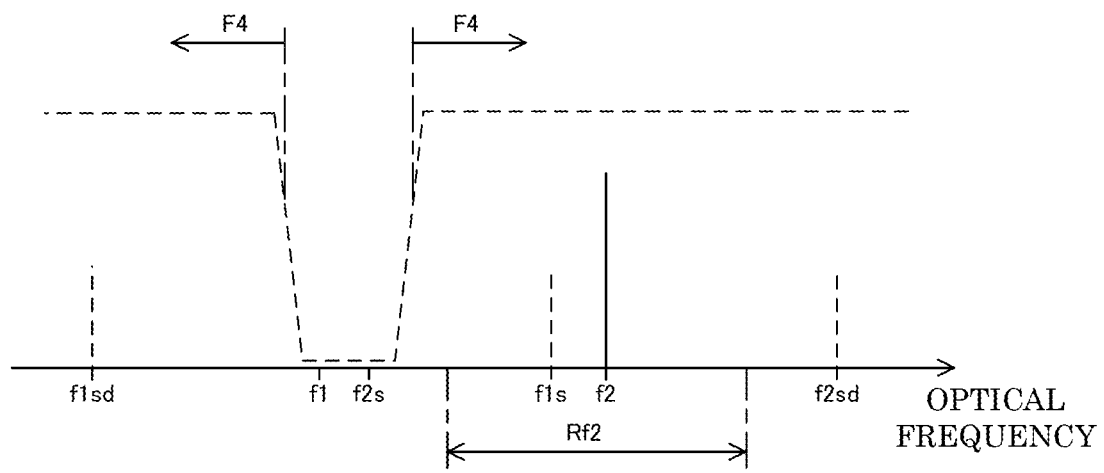
FIG. 12 is a diagram showing an example of the passband of the optical filter of the electromagnetic wave measuring apparatus according to the modification 3 of the first embodiment of the present disclosure.

FIG. 12 is a diagram showing an example of the passband of the optical filter of the electromagnetic wave measuring apparatus according to the modification 3 of the first embodiment of the present disclosure. In FIG. 12, the horizontal axis indicates the optical frequency [Hz]. Referring to FIG. 12, the optical filter 114 allows the laser beam R2 of the frequency f2, the sideband beam R1s of the frequency f1s, the sideband beam R1sd of the frequency f1sd, and the sideband beam R2sd of the frequency f2sd to pass therethrough without attenuation, while attenuating the laser beam R1 of the frequency f1 and the sideband beam R2s of the frequency f2s. For example, the passband F4 of the optical filter 114 does not overlap the frequency range Rf2 in which the frequency f2 of the laser beam R2 is settable.

Note that the optical filter 114 need only attenuate at least one of the laser beam R1 of the frequency f1 and the sideband beam R2s of the frequency f2s. That is, the optical filter 114 may allow at least one of the sideband beam R2s of the frequency f2s and the laser beam R1 of the frequency f1 to pass therethrough without attenuation. In this case as well, the beat signal Bs can be obtained at the light-receiving element 14.

The electromagnetic wave measuring apparatus 204 is configured to use the optical filter 114 to attenuate the laser beam R1 of the fixed frequency f1 and extract the laser beam R2 of the variable frequency f2 and the sideband beam R1s. Thus, even if the frequency f2 of the laser beam R2 to be output by the light-emitting element 2b is changed within the frequency range Rf2, the optical filter 114 need not be changed, and it is possible to extract the laser beam R1 of the frequency f1 and the sideband beam R2s of the frequency f2s using the same optical filter 114 and obtain the beat signal Bs of the frequency fs in the IF band using the light-receiving element 14. Accordingly, the electric field of the detection-target electromagnetic wave 36 can be easily measured while changing the settings of the frequency difference between the laser beams R1 and R2.

The electromagnetic wave measuring apparatus according to the embodiment of the present disclosure is provided with a computer that includes a memory, and a processor such as a CPU of the computer reads out a program that includes some or all of the steps of the following flowchart from the memory, and executes the program. The program for this apparatus can be installed from the outside. The program for this apparatus is distributed in a state of being stored in a recording medium or distributed via a communication line.

Figure 13:
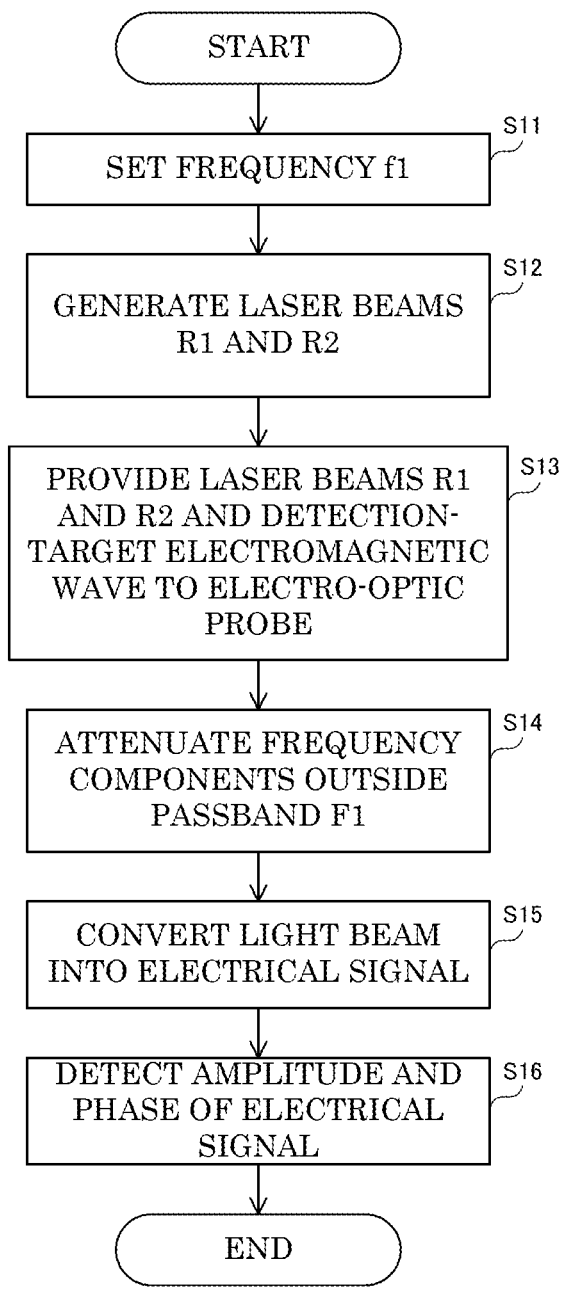
FIG. 13 is a diagram showing a procedure of an electromagnetic wave measuring method using the electromagnetic wave measuring apparatus according to the first embodiment of the present disclosure.

FIG. 13 is a diagram showing a procedure of an electromagnetic wave measuring method using the electromagnetic wave measuring apparatus according to the first embodiment of the present disclosure. FIG. 13 shows a procedure of the electromagnetic wave measuring method using the electromagnetic wave measuring apparatus 201.

Referring to FIG. 13, initially, the frequency f1 of the laser beam R1 is set within the frequency range Rf1 (step S11).

Next, the laser beam R1 of the set frequency f1 and the laser beam R2 are generated (step S12).

Next, the generated laser beams R1 and R2 and the detection-target electromagnetic wave 36 are provided to the electro-optic probe 51 (step S13).

Next, frequency components outside the passband F1, of the light beams output from the electro-optic probe 51, are attenuated using the optical filter 111. More specifically, the electro-optic probe 51 outputs the laser beams R1 and R2 and the sideband beams R1s and R2s to the optical filter 111. Frequency components excluding the frequency components of the laser beam R2 and the sideband beam R1s are attenuated, as frequency components outside the passband F1, using the optical filter 111 (step S14).

Next, the light beam that has passed through the optical filter 111 is converted to the beat signal Bs using the light-receiving element 14 (step S15).

Next, the amplitude and phase of the beat signal Bs obtained by the conversion are detected using the amplitude/phase detector 15 (step S16).

Note that, in an electromagnetic wave measuring method using the electromagnetic wave measuring apparatus 202 according to the modification 1, the frequency f2 of the laser beam R2 is set in the frequency range Rf2 in step S11, and frequency components outside the passband F2, of the light beams output from the electro-optic probe 51, are attenuated using the optical filter 112 in step S14.

Note that, in an electromagnetic wave measuring method using the electromagnetic wave measuring apparatus 203 according to the modification 2, frequency components outside the passband F3, of the light beams output from the electro-optic probe 51, are attenuated using the optical filter 113 in step S14.

Also, in the electromagnetic wave measuring method using the electromagnetic wave measuring apparatus 203 according to the modification 3, the frequency f2 of the laser beam R2 is set in the frequency range Rf2 in step S11, and frequency components outside the passband F4, of the light beams output from the electro-optic probe 51, are attenuated using the optical filter 114 in step S14.

Next, other embodiments of the present disclosure will be described with reference to the drawings. Note that the same components or equivalent components in the drawings are assigned the same reference numerals, and descriptions thereof will not be repeated.

Second Embodiment

Configuration and Basic Operation

The present embodiment relates to an electromagnetic wave measuring apparatus 205 that performs asynchronous measurement, compared to the electromagnetic wave measuring apparatuses 201, 202, 203, and 204 according to the first embodiment. Features other than the following content are the same as the electromagnetic wave measuring apparatus 201 according to the first embodiment.

Figure 14:
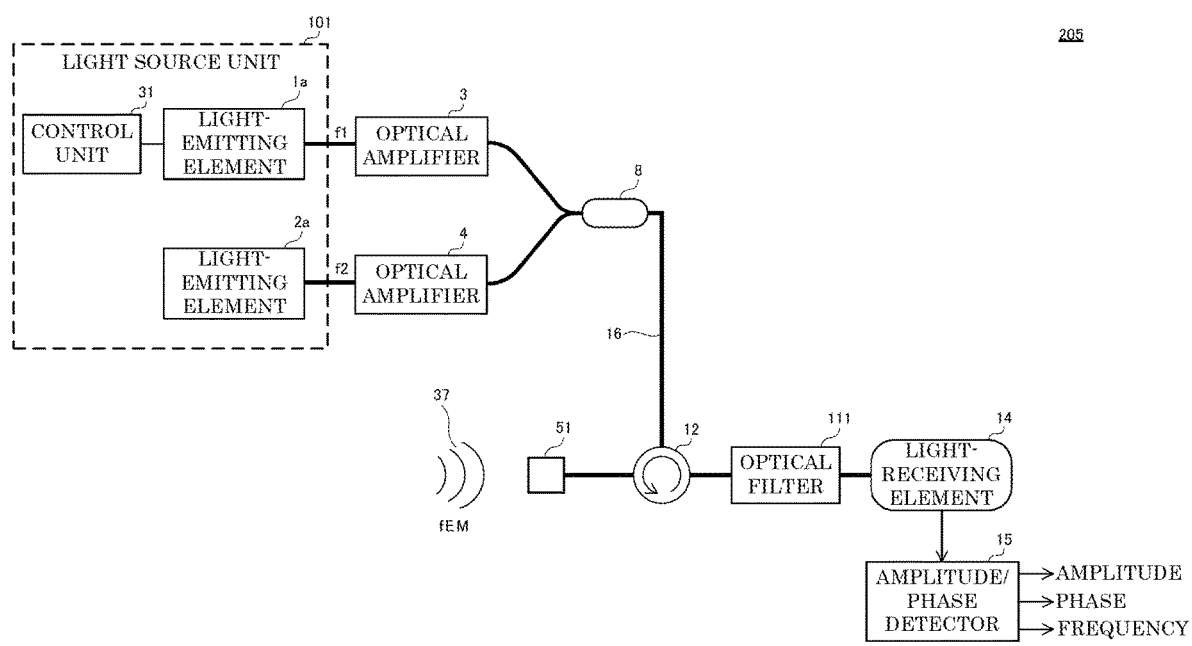
FIG. 14 is a diagram showing a configuration of an electromagnetic wave measuring apparatus according to the second embodiment of the present disclosure.

FIG. 14 is a diagram showing a configuration of an electromagnetic wave measuring apparatus according to the second embodiment of the present disclosure. Referring to FIG. 14, compared to the electromagnetic wave measuring apparatus 201, the electromagnetic wave measuring apparatus 205 does not include the beam splitters 5 and 6, the optical multiplexer 7, the beam shifter 9, the oscillator 11, and the light/electromagnetic wave conversion unit 20. The electromagnetic wave measuring apparatus 205 measures a detection-target electromagnetic wave 37. The detection-target electromagnetic wave 37 is, for example, an electromagnetic wave in the RF band. The electromagnetic wave measuring apparatus 205 performs asynchronous measurement, in which the detection-target electromagnetic wave 37 is not synchronous with the probe beam. Here, if the frequency of the detection-target electromagnetic wave 37 is fEM, it is assumed that the relationship fEM≠f2−f1 holds true.

The optical amplifiers 3 and 4 amplify the laser beams R1 and R2 output by the light source unit 101, and output the amplified laser beams R1 and R2 to the optical multiplexer 8.

The optical multiplexer 8 multiplexes the laser beams R1 and R2 received from the optical amplifiers 3 and 4, and outputs the resultant beams to the electro-optic probe 51 via the circulator 12.

The electro-optic probe 51 receives the laser beams R1 and R2 output by the light source unit 101, and the detection-target electromagnetic wave 37. The electro-optic probe 51 detects the detection-target electromagnetic wave 37. More specifically, a light beam transmitted from the circulator 12 to the electro-optic probe 51 interacts, in the electro-optic probe 51, with the detection-target electromagnetic wave 37, is reflected and output to the circulator 12, and is output from the circulator 12 to the optical filter 111.

The optical filter 111 receives the light beams output from the electro-optic probe 51 and attenuates frequency components outside a predetermined passband F1. More specifically, the optical filter 111 attenuates components outside the passband F1, out of the frequency components of the light beams received from the circulator 12. For example, the optical filter 111 is a band pass filter.

Figure 15:
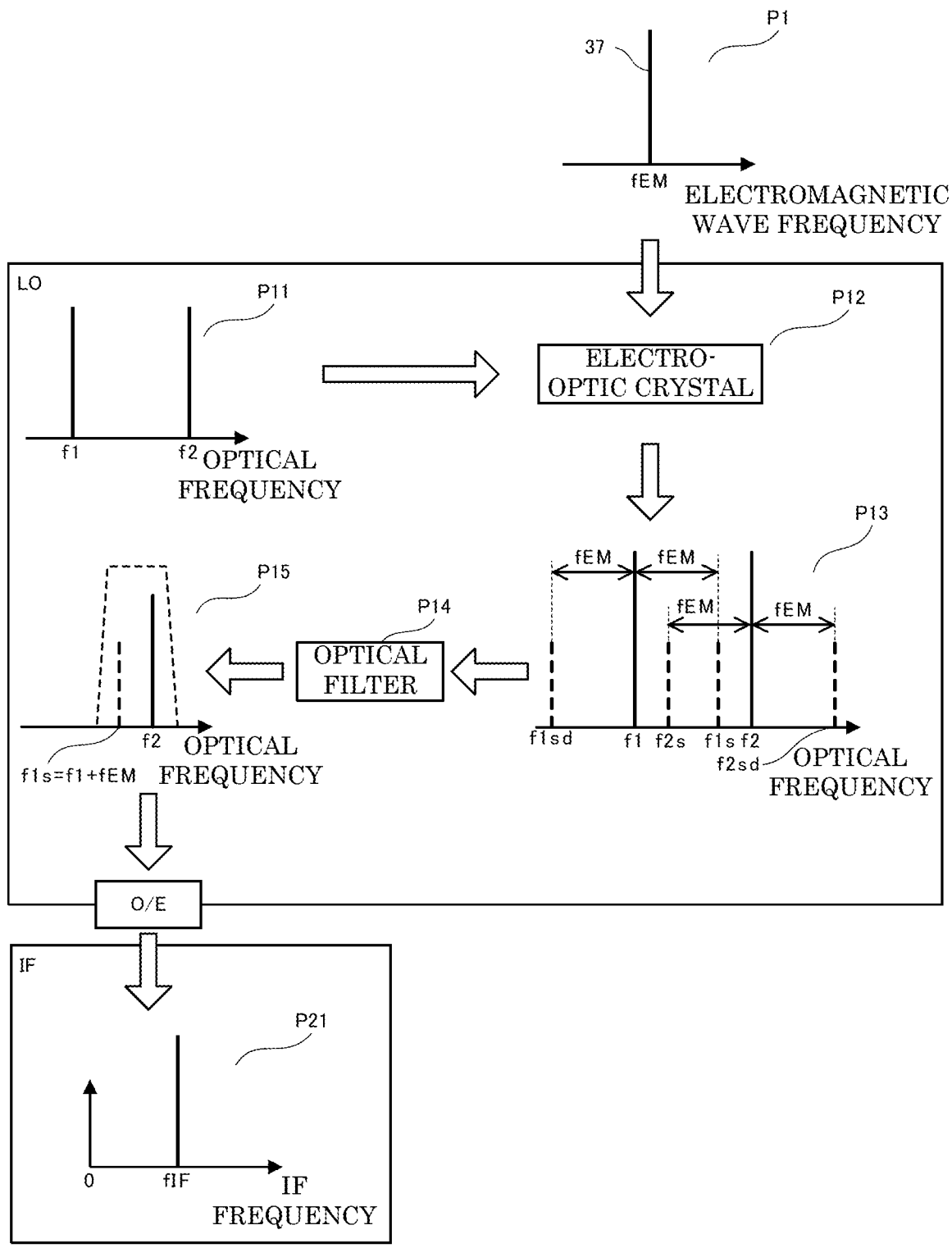
FIG. 15 is a diagram showing a measurement principle of the electromagnetic wave measuring apparatus according to the second embodiment of the present disclosure.

FIG. 15 is a diagram showing a measurement principle of the electromagnetic wave measuring apparatus according to the second embodiment of the present disclosure. Here, the case where the detection-target electromagnetic wave 37 is CW is described with reference to FIGS. 14 and 15, for ease of understanding.

The detection-target electromagnetic wave 37 having a frequency of fEM is radiated in the direction of an electro-optic crystal of the electro-optic probe 51 (phase P1). The laser beam R1 of the frequency f1 and the laser beam R2 of the frequency f2 multiplexed by the optical multiplexer 8 (phase P11) serve as probe beams and are transmitted to the electro-optic crystal of the electro-optic probe 51 (phase P12).

The electro-optic probe 51 outputs, to the optical filter 111, the laser beams R1 and R2, sideband beams R1s and R1sd, which are generated by modulating the laser beam R1, and sideband beams R2s and R2sd, which are generated by modulating the laser beam R2.

More specifically, a component of the frequency f1 of the probe beams is modulated within the electro-optic crystal that has been irradiated with the detection-target electromagnetic wave 37, and the sideband beam R1s that is a component of a frequency f1s (=f1+fEM) and the sideband beam R1sd that is a component of a frequency f1sd (=f1−fEM) are generated. Also, a component of the frequency f2 of the probe beam is modulated within the electro-optic crystal that has been irradiated with the detection-target electromagnetic wave 37, and the sideband beam R2s that is a component of a frequency f2s (=f2−fEM) and the sideband beam R2sd that is a component of a frequency f2sd (=f2+fEM) are generated (phase P13). These generated light beams are transmitted to the optical filter 111 together with the probe beams of the frequency f1 and the frequency f2 (phase P14).

The optical filter 111 attenuates frequency components outside the passband F1, namely the frequency component of the laser beam R1 and the frequency component of the sideband beam R2s. Specifically, the optical filter 111 attenuates frequency components outside the passband F1, namely frequency components excluding the frequency components of the laser beam R2 and the sideband beam R1s. That is, the laser beam R2 of the frequency f2 and the sideband beam R1s of the frequency f1s are extracted by the optical filter 111 (phase P15).

The light beams extracted by the optical filter 111 are transmitted to the light-receiving element 14 and subjected to photoelectric conversion, and a beat signal Bs of a frequency f2−f1s=fIF in the IF band is obtained (phase P21).

Note that, similar to the above-described modification 1, the electromagnetic wave measuring apparatus 205 may include the light source unit 102 instead of the light source unit 101, and the optical filter 112 instead of the optical filter 111.

Further, similar to the above-described modification 2, the electromagnetic wave measuring apparatus 205 may include the optical filter 113 instead of the optical filter 111.

Further, similar to the above-described modification 3, the electromagnetic wave measuring apparatus 205 may include the light source unit 102 instead of the light source unit 101, and the optical filter 114 instead of the optical filter 111.

The foregoing embodiments are to be construed in all respects as illustrative and not restrictive. The scope of the present disclosure is defined by the claims rather than the description above, and is intended to include all modifications within the meaning and scope of the claims and equivalents thereof.

What is claimed is:

1. An electromagnetic wave measuring apparatus, comprising:
    a light source unit configured to output a first laser beam whose frequency is settable in a predetermined frequency range, and a second laser beam;
    an electro-optic probe configured to receive the first laser beam of a frequency that has been set in the frequency range, the second laser beam, and a detection-target electromagnetic wave;
    an optical filter configured to receive a light beam output from the electro-optic probe and attenuate a frequency component outside a predetermined passband; and
    a light-receiving element configured to convert a light beam that has passed through the optical filter into an electrical signal,
    wherein the electro-optic probe outputs, to the optical filter, the first laser beam, the second laser beam, a first sideband beam generated by modulating the first laser beam, and a second sideband beam generated by modulating the second laser beam,
    wherein the optical filter attenuates the frequency component outside the passband, which is at least one of a frequency component of the first laser beam and a frequency component of the second sideband beam, or at least one of a frequency component of the second laser beam and a frequency component of the first sideband beam, and
    wherein the light source unit includes:
        a variable-wavelength first laser configured to output the first laser beam,
        a second laser configured to output the second laser beam, and
        a control unit configured to control the frequency of the first laser beam to be output by the first laser.

2. The electromagnetic wave measuring apparatus according to claim 1, wherein the optical filter is a band pass filter, and
    wherein the optical filter attenuates the frequency component outside the passband, which is at least one of the frequency component of the first laser beam and the frequency component of the second sideband beam.

3. The electromagnetic wave measuring apparatus according to claim 1, wherein the optical filter is a band elimination filter, and
    wherein the optical filter attenuates the frequency component outside the passband, which is at least one of the frequency component of the second laser beam and the frequency component of the first sideband beam.

4. The electromagnetic wave measuring apparatus according to claim 1, wherein the passband of the optical filter does not overlap the frequency range.

5. The electromagnetic wave measuring apparatus according to claim 1, further comprising:
    a beam shifter configured to shift a frequency of the first laser beam; and
    a light/electromagnetic wave conversion unit configured to irradiate the electro-optic probe with an electromagnetic wave having a frequency equal to a difference between the frequency of the first laser beam whose frequency has been shifted by the beam shifter and a frequency of the second laser beam.

6. The electromagnetic wave measuring apparatus according to claim 1, further comprising:
    a beam shifter configured to shift a frequency of the second laser beam; and
    a light/electromagnetic wave conversion unit configured to irradiate the electro-optic probe with an electromagnetic wave having a frequency equal to a difference between a frequency of the first laser beam and the frequency of the second laser beam whose frequency has been shifted by the beam shifter.

7. The electromagnetic wave measuring apparatus according to claim 1, wherein the light source unit outputs the second laser beam whose frequency is settable.

8. An electromagnetic wave measuring method for use in an electromagnetic wave measuring apparatus, the method comprising:
    a step of setting a frequency in a predetermined frequency range;
    a step of generating a first laser beam of the frequency that has been set in the frequency range, and a second laser beam;
    a step of providing the generated first laser beam and second laser beam and a detection-target electromagnetic wave to an electro-optic probe;
    a step of attenuating, using an optical filter, a frequency component outside a predetermined passband, of a light beam output from the electro-optic probe; and
    a step of converting a light beam that has passed through the optical filter into an electrical signal, using a light-receiving element,
    wherein the electro-optic probe outputs, to the optical filter, the first laser beam, the second laser beam, a first sideband beam generated by modulating the first laser beam, and a second sideband beam generated by modulating the second laser beam,
    wherein, in the step of attenuating the frequency component outside the passband, the frequency component outside the passband is attenuated, which is at least one of a frequency component of the first laser beam and a frequency component of the second sideband beam, or at least one of a frequency component of the second laser beam and a frequency component of the first sideband beam, and
    wherein, in the step of generating the first laser beam, the first laser beam is generated by a variable-wavelength first laser and the second laser beam is generated by a second laser.

9. The method according to claim 8, wherein the passband of the optical filter does not overlap the frequency range.

* * * * *